Nov. 24, 1959 D. N. MacDONALD 2,914,752

INFORMATION STORAGE SYSTEM

Filed May 9, 1955 5 Sheets-Sheet 1

INVENTOR.
DUNCAN N. MAC DONALD

BY

Christie, Parker & Hale
ATTORNEYS

Nov. 24, 1959 D. N. MacDONALD 2,914,752

INFORMATION STORAGE SYSTEM

Filed May 9, 1955 5 Sheets-Sheet 2

INVENTOR.
DUNCAN N. MAC DONALD

BY

Christie, Parker & Hale
ATTORNEYS

Nov. 24, 1959 D. N. MacDONALD 2,914,752

INFORMATION STORAGE SYSTEM

Filed May 9, 1955 5 Sheets-Sheet 3

INVENTOR.
DUNCAN N. MACDONALD
BY
Christie, Parker & Hale
ATTORNEYS

Nov. 24, 1959

D. N. MacDONALD 2,914,752

INFORMATION STORAGE SYSTEM

Filed May 9, 1955

5 Sheets-Sheet 4

INVENTOR.
DUNCAN N. MAC DONALD

BY

Christie, Parker & Hale
ATTORNEYS

Nov. 24, 1959 D. N. MacDONALD 2,914,752

INFORMATION STORAGE SYSTEM

Filed May 9, 1955 5 Sheets-Sheet 5

INVENTOR.
DUNCAN N. MAC.DONALD

BY

Christie, Parker & Hale
ATTORNEYS

United States Patent Office 2,914,752

Patented Nov. 24, 1959

2,914,752

INFORMATION STORAGE SYSTEM

Duncan N. MacDonald, Arcadia, Calif., assignor, by mesne assignments, to Burroughs Corporation, Detroit, Mich., a corporation of Michigan Application May 9, 1955, Serial No. 506,875

3 Claims. (Cl. 340—174)

This invention relates to information storage systems and more particularly, to a new and improved information storage system in which information may be recorded or reproduced from selected ones of a plurality of elongated recording media.

In data processing systems it is often necessary to store large quantities of information in a manner in which a selected piece of information is readily accessible. One conventional way in which information may be stored is by means of a magnetizable tape and a tape recorder. However, where a large quantity of information is to be stored, the tape becomes relatively long, with the result that the access time required to derive information recorded on a distant part of the tape is excessive.

Consequently, there is a need for an information storage system having the capacity to store a large quantity of information in such a manner that a selected piece of information is readily accessible.

In accordance with the present invention, there is provided a high capacity information storage system in which a plurality of elongated recording media are arranged to be selectively transported and recorded or read with a relatively short interval being required to find a selected recording location.

Briefly, the present invention comprises apparatus in which each of a plurality of elongated recording media may be selectively transported through an operational zone past a transducer which is adapted to read or record on the medium being transported.

In an illustrative embodiment of the invention, a plurality of tapes are supported in parallel looped relation in an operational zone, compartmented bins are arranged to store the portions of the tapes not in the operational zone, and a carriage is adapted to be transported transversely of the tapes within the operational zone. The carriage bears at least one transducer for recording or reading a selected one of the tapes and means for causing the selected tape to be transported past the transducer.

An understanding of the operation and construction of an illustrative embodiment of the invention, along with the advantages thereof, may be had upon a reading of the following specification and an inspection of the drawings, in which.

In the drawings, the reference characters indicate similar parts in the several views.

*General description*

Figure 1:
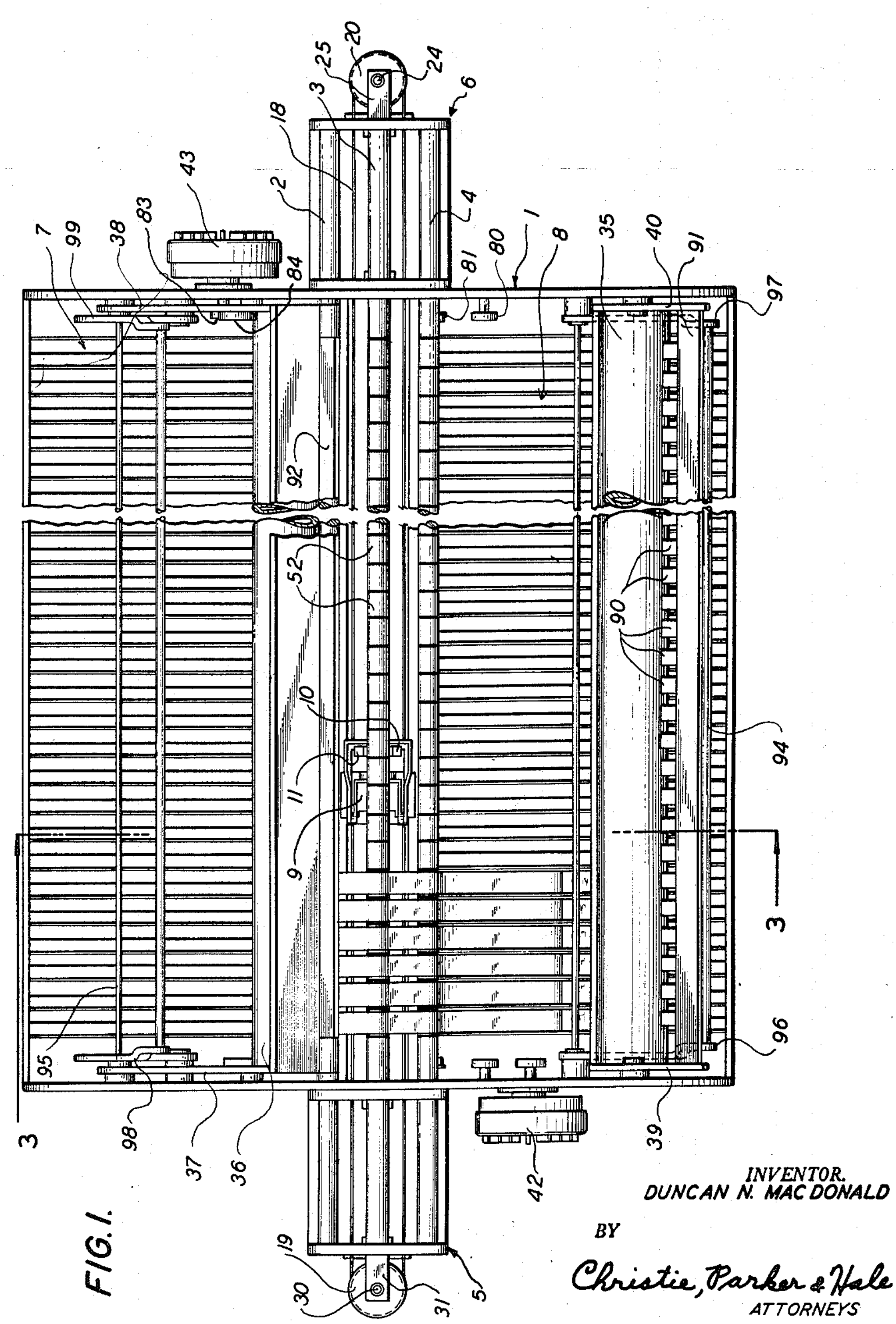
Fig. 1 is a plan view of an exemplary information storage unit constructed in accordance with the present invention.

The apparatus of Fig. 1 includes a frame 1 which holds a framework comprising the tape support rods 2, 3 and 4.

The tape support rods 2, 3 and 4 may be held rigidly by means of the box-shaped braces 5 and 6. Below the tape support rod 2 is located a tape bin 7 and below the tape support rod 4 is located a tape bin 8. The tape bins 7 and 8 each may comprise perforated metal separators which are fastened together to form individual tape compartments. A description of one suitable construction for the tape bins 7 and 8 may be found in my copending application entitled "Tape Storage Bin," filed October 22, 1954, Serial Number 463,891.

Figure 2:
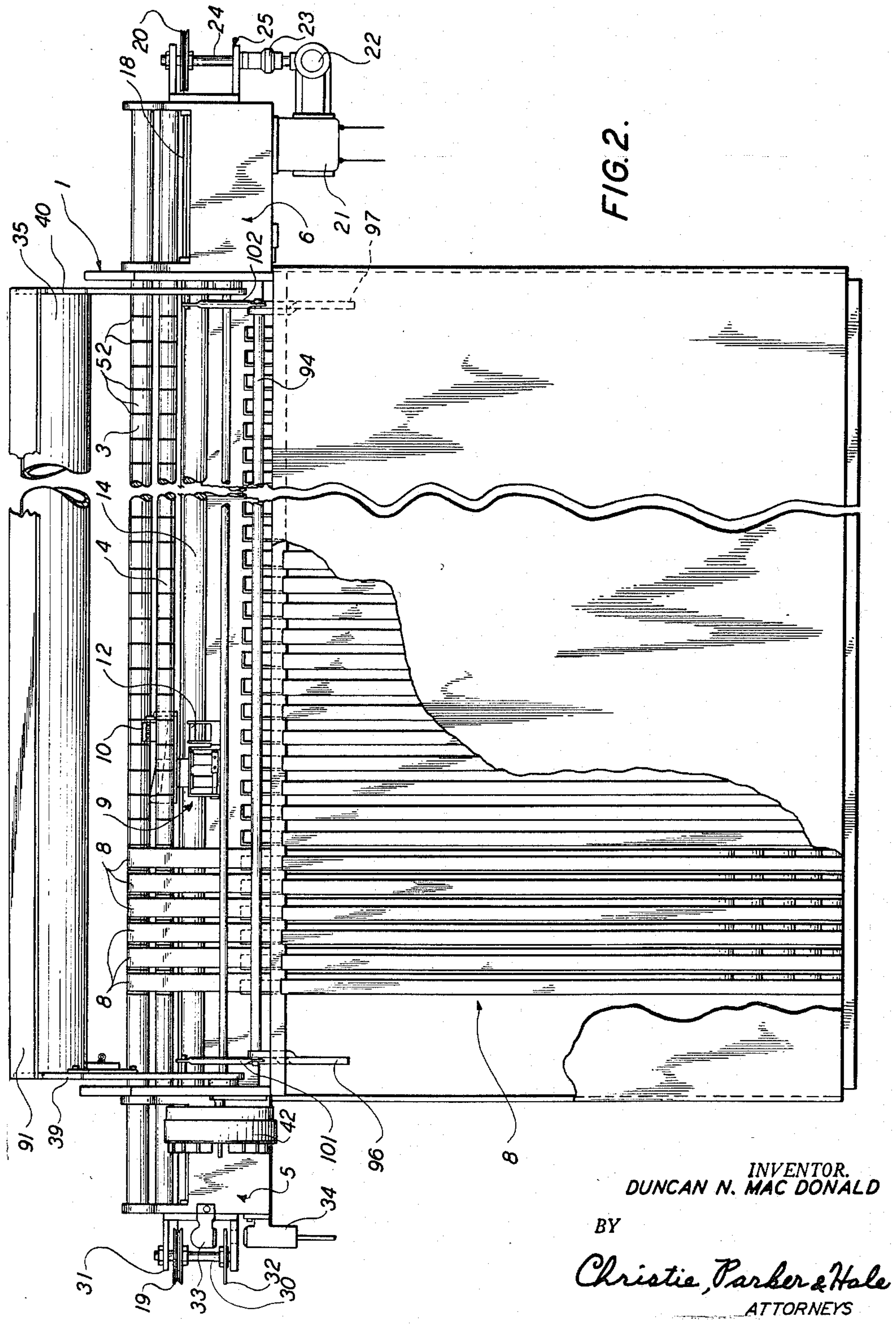
Fig. 2 is an elevational view, partly broken away, of the information storage unit of Fig. 1.

A plurality of magnetizable tapes may be stored in the apparatus by draping them over the tape support rods 2, 3 and 4 so that the end portions are loosely held in corresponding compartments in the bins 7 and 8. A break is shown in the length of the apparatus to indicate that it may be constructed to accommodate any number of tapes. However, one workable embodiment has been constructed with a fifty tape capacity. In order to leave the major portion of the apparatus visible, only six tapes are shown in Figs. 1 and 2.

A carriage 9 bears the transducers 10 and 11, and a pair of pinch rollers 12 and 13. The carriage 9 is slidably mounted on a carriage support rod 14 which is fastened to the frame 1 and the braces 5 and 6 below the tape support rods 2, 3 and 4. The carriage 9 is held in a vertical position by a pair of guide rollers 15 and 16 (Fig. 3) which engage a carriage guide rod 17 extending the length of the machine below the carriage support rod 14.

The carriage 9 may be moved along the carriage support rod 14 to a position for reading or recording a selected one of the tapes. The general area in which reading and writing operations are performed on a selected one of the tapes may be termed the operational zone. In the operational zone, each of the tapes is held in open-looped fashion by the rods 2, 3 and 4 (best seen in Fig. 3). The carriage 9 may be moved along the carriage support rod transversely of the tapes by means of a band 18. The band 18 is supported by sheaves 19 and 20 and is attached to the carriage 9. A carriage motor 21 may be mounted on the brace 6 for driving the sheave 20 via a gear box 22, a flexible coupling 23, and a shaft 24. The shaft 24 is journaled in a U-shaped bracket 25 attached to the brace 6.

At the other end of the machine, the sheave 19 is attached to a shaft 30 which is journalled in a U-shaped bracket 31 supported by the brace 5. The shaft 30 drives a slotted disk 32 for interrupting a beam of light supplied by a lamp 33.

A photocell 34 senses interruptions in the light from the lamp 33. By interrupting the light once for each position of the carriage which corresponds to a tape, an electrical signal is provided by the photocell 34, which may be used to identify the location of the carriage. For example, assuming the carriage 9 is transported from one end of the machine towards the other end of the machine, an electrical impulse will be supplied by the photocell 34 each time the carriage 9 passes a tape. By means of a conventional electronic counter the number of impulses may be registered, thereby indicating the location of the carriage.

When the carriage 9 is adjacent a selected tape, the transducers 10 and 11 may be moved into engagement with the tape. In order to transport the selected tape through the operational zone past the transducers 10 and 11, there is provided a pair of tape transport rollers 35 and 36. Each of the tape transport rollers is held between pivoted lift arms 37, 38, 39 and 40 so that the rollers may be swung out of drive position in order to load the machine with tapes. For the sake of illustration, the tape transport roller 35 and the lift arms 39 and 40 are shown in open position, against stops like stop 41 (Fig. 3), while the tape transport roller 36 and the lift arms 37 and 38 are shown in closed or drive position.

In closed or drive position, the tape transport roller 35 is driven by a motor 42 and, in like manner, the tape transport roller 36 is driven by a motor 43. By actuating either the pinch roller 12 or the pinch roller 13 attached to the carriage 9, a selected tape may be placed in engagement with the tape transport roller 35 or the tape transport roller 36 (see Fig. 3). Assuming that the pinch roller 12 is actuated, the tape will be transported from bin 7 through the operational zone over guide rods 2, 3 and 4 to bin 8. In like manner, if pinch roller 13 is actuated, the tape will be transported from bin 8 via guide rods 4, 3 and 2 to bin 7. Thus, the direction of tape transport is determined by the selection of the pinch roller to be actuated.

*The carriage*

Figure 3:
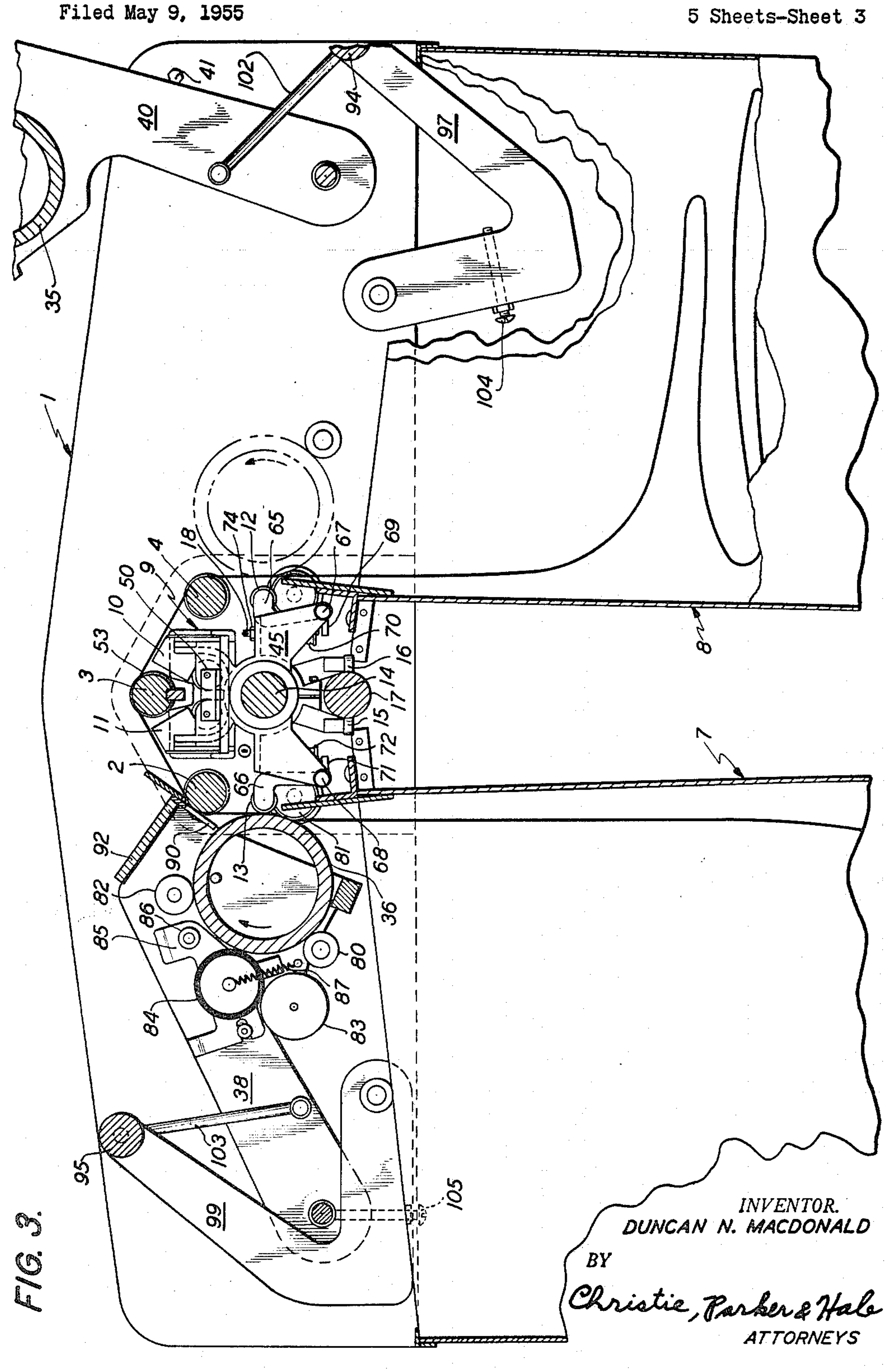
Fig. 3 is a fragmentary sectional view of the information storage unit taken along line 3—3 of Fig. 2.
Figure 4:
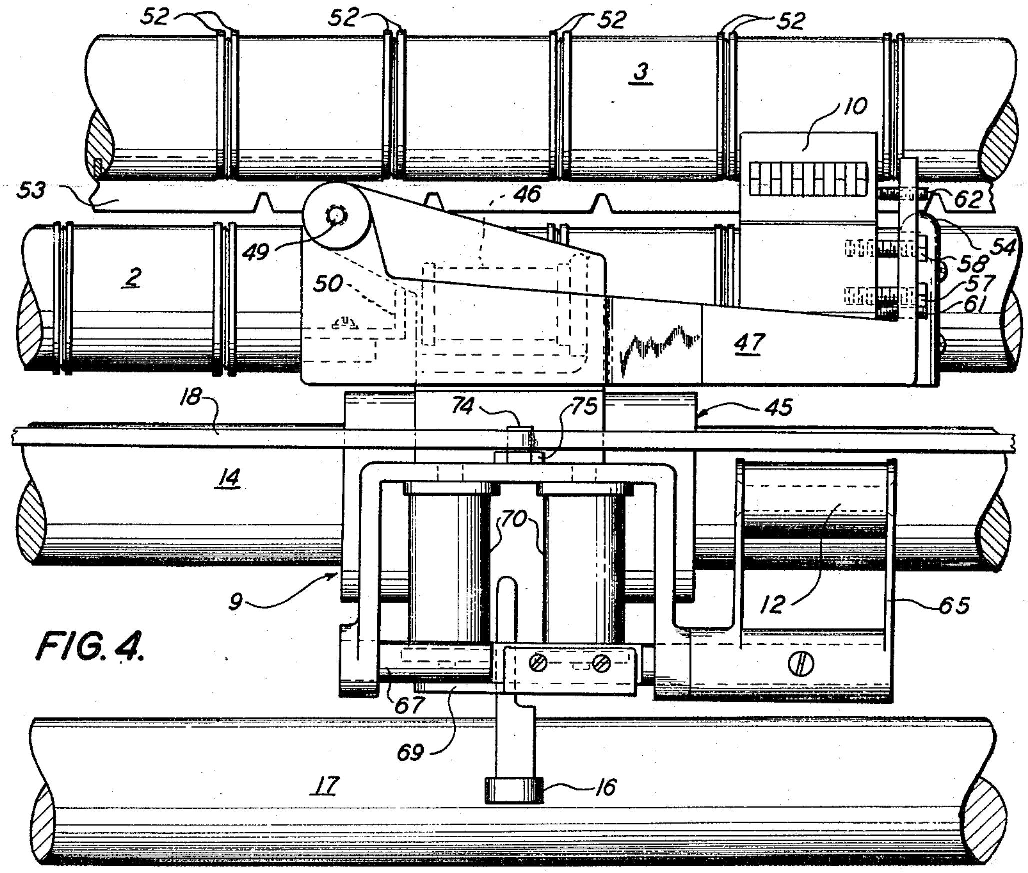
Fig. 4 is an elevational view of the carriage in place in the information storage unit of Figs. 1–3.
Figure 5:
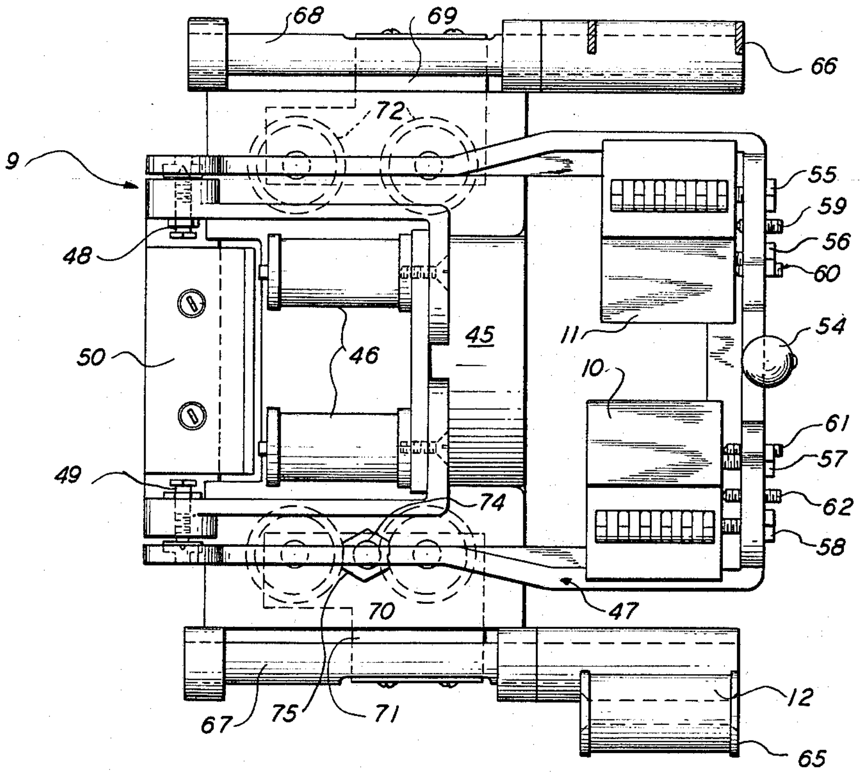
Fig. 5 is a plan view of the carriage of the information storage unit of Figs. 1–3.

An elevational view of the carriage 9 is shown in Fig. 4, a plan view of the carriage is shown in Fig. 5, and an end view of the carriage, looking at the carriage as shown in Fig. 4 from the left-hand end, is included in Fig. 3.

As noted previously, the carriage 9 is slidably supported on a carriage support rod 14. The carriage 9 comprises a frame 45 which surrounds the support rod 14. The upper portion of the carriage frame 45 supports a pair of electromagnets 46. In addition, a transducer support frame 47 is pivotally supported by the frame 45 by means of the pivot screws 48 and 49. Attached to the transducer support frame 47 is an armature 50 which is adapted to raise the transducer support frame 47 when the electromagnets 46 are energized.

When the armature 50 is drawn towards the electromagnets 46, the transducer support frame 47 raises the transducers 10 and 11 into engagement with a selected tape. The transducers 10 and 11 comprise magnetic recording heads which are adapted to read or record a magnetizable record. Each of the transducers 10 and 11 in the illustrative embodiment of Fig. 5 includes a total of six separate magnetic recording and reproducing heads, only the pole pieces of which are visible. By spacing the individual magnetic heads of each of the transducers apart, and by aligning the pole pieces of the transducer 10 with the spaces between the pole pieces of the transducer 11, a total of twelve tracks may be recorded on a single tape in interleaved fashion.

Ordinarily, where digital information is being recorded, all six tracks relating to one of the transducers will be read simultaneously to provide signals which are coded in accordance with the digital information. Thus, two groups of information are recorded side by side, but ordinarily only one of the transducers 10 and 11 will be energized for reading or recording at any given time.

In order that the transducers 10 and 11 may be accurately aligned with the tapes so as to record information reliably and recover the information without crosstalk from adjacent tracks, there is provided an indexing mechanism for accurately positioning the carriage relative to each of the lengths of tape.

To hold each tape in position, the tape guide rods are each provided with separators. The separators may comprise rings 52 (Fig. 4) of spring steel which are slipped into accurately milled slots in the guide rods 2, 3 and 4. By leaving only a slight clearance between the tapes and the separators 52, the tapes may be accurately aligned with respect to the guide rods 2, 3 and 4. By accurately positioning the carriage 9 with respect to the guide rods 2, 3 and 4, the transducers 10 and 11 may be accurately aligned with the tapes. In order to align the carriage accurately with the guide rods, an indexing strip is mounted beneath the top guide rod 4. The indexing strip 53 is notched for each tape position.

A spherical pawl 54 is mounted on the transducer support frame 47 of the carriage 9 for engaging the indexing strip 53. By raising the transducer support frame 47 as described above, the spherical pawl 54 may be inserted in one of the notches of the indexing strip 53, thereby holding the carriage 9 in position with respect to the guide rod 4. The spherical shape of the pawl 54 adjusts the position of the carriage 9 slightly until both sides of the pawl 54 are in contact with the sides of the notch in the indexing strip 53. By means of the adjustment of position provided by the spherical pawl 54, compensation is offered for a small amount of overshoot in travel of the carriage 9.

The flexible coupling 23 (Fig. 1) between the gear box 22 and the shaft 24 cushions the carriage drive motor 21 from a sudden stopping of transport of the carriage 9, and also provides a certain amount of play to allow for the adjustment of carriage position by the spherical pawl 54.

The initial alignment of the transducers 10 and 11 may be adjusted by means of the mounting screws 55, 56, 57 and 58, and the set screws 59, 60, 61 and 62.

Each of the pinch rollers 12, 13 is rotatably mounted in a pinch roller support arm 65, 66. For convenience of illustration the pinch roller 13 is omitted from Fig. 5 although it may be seen in Fig. 3. Each of the pinch roller support arms 65, 66 is attached to a shaft 67, 68 which is journalled in the carriage frame 45. An armature 69 is attached to the shaft 67 which may be drawn toward a pair of electromagnets 70, thereby rotating the shaft 67 and urging the pinch roller 12 outwardly to engage a selected tape with the tape transport roller 35.

In like manner, an armature 71 is attached to the shaft 68 which may be drawn toward a pair of electromagnets 72 for urging the pinch roller 13 outwardly to engage a selected tape with the tape transport roller 36.

When the tape transport rollers 35 and 36 are rotating, the actuation of the electromagnets 70 causes the selected tape to be transported from bin 7 to bin 8. Likewise, when the electromagnets 72 are actuated, the tape is transported in the opposite direction, i.e. from bin 8 to bin 7. Thus, a selected tape may be transported in either direction in accordance with the pair of electromagnets 70, 72 which are energized. The carriage drive band 18 may be attached to the carriage frame 45 by means of a threaded pin 74 which is held in place by means of a lock nut 75. Although the band 18 passes on each side of the carriage 9, it is attached on the side of the carriage nearest bin 8 only.

*Tape transport roller drive system*

The tape transport roller drive mechanism may be seen in Figs. 1, 2 and 3. As shown in Fig. 3, one end of the idler roller 36 rests on the idler rollers 80 and 81 attached to the frame 1. The tape transport roller 36 is held in engagement with the idler rollers 80 and 81 by an idler roller 82 attached to the roller lift arm 38. The tape transport roller 36 may be driven from the motor 43 via a capstan 83 and a rubber covered idler wheel 84. The idler wheel 84 is attached to an adjustable bracket 85 which is pivoted to the roller life arm 38 by a suitable fastener 86. By means of a spring 87 attached between the idler wheel 84 and the frame 1, the idler wheel 84 is held in engagement with the capstan 83 and the tape transport roller 36. Thus, the capstan 83 drives the idler wheel 84, which in turn drives the tape transport roller 36 to provide rotation of the tape transport roller 36 from the motor 43.

In order to hold the tapes taut in the operational zone, spring-like fingers 90 (Fig. 2) for each tape are mounted on cross bars 91, 92 extending the length of the machine between the lift arms 37, 38, 39, 40 for lightly holding each tape in engagement with the tape support rods 2 and 4.

The tape transport roller 36 is supported at the end opposite that shown in Fig. 3 by idler rollers similar to the idler rollers 80, 81 and 82. However, the rubber covered idler wheel 84 and the bracket 85 may be omitted since the tape transport roller 36 need be driven from one end only.

The tape transport roller 35, shown in open position, may be supported between the lift arms 39 and 40 and driven from the motor 42 by idler rollers and an idler wheel attached to an adjustable bracket similar to that described in detail with respect to the tape transport roller 36.

The tape transport rollers 35 and 36 may be moved between drive and open position by means of the handles 94 and 95, each of which is mounted to a pair of handle arms 96, 97 and 98, 99 respectively. Each of the handle arms 96, 97, 98, 99 may be pivotally supported by the frame 1 below the roller lift arms 37, 38, 39 and 40 as shown.

When the handle 94 is pulled away from the machine the lift arms 39 and 40 are raised by the lift rods 101 and 102 (Figs. 2 and 3). In like manner, the tape transport roller 36 may be moved between open and closed position by means of the handle 95 which raises and lowers the lift arms 37 and 38 via a pair of lift rods. Due to the fact that the tape transport roller 36 is illustrated in closed position, only one of the lift rods 103 associated with the roller lift arm 38 is visible (Fig. 3).

In order to provide a stop for the handle arms 96, 97, 98 and 99 in closed position, there may be threaded through each handle arm a stop screw for bearing against the pivot of its associated roller lift arm. For example, the stop screws 104 and 105 threaded through the handle arms 97 and 99 are visible in Fig. 3.

It will be appreciated that when the machine is being loaded with tape, both the tape transport rollers 35 and 36 will be moved to open position. This leaves room to drape the tapes over the guide rods 2, 3 and 4 so that the ends of the tapes are loosely stored in serpentine loops in the bins 7 and 8. When the machine is fully loaded, the tape transport rollers 35 and 36 may be moved to closed position where they are driven in opposite directions of rotation by means of the motors 42 and 43 which are energized from a suitable source of alternating current (not shown). The motors 42 and 43 shown in the illustrative embodiment may be of a conventional variety as for example, conventional outside-in induction motors.

*Carriage control circuit*

Figure 7:
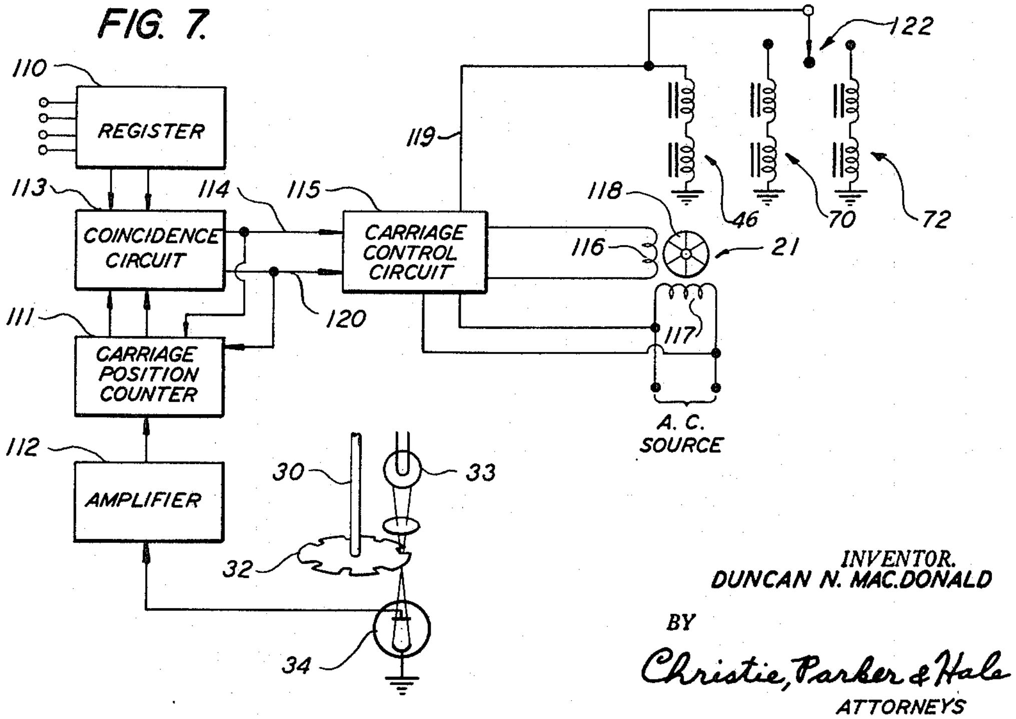
Fig. 7 is a combined block and schematic circuit diagram of a carriage control circuit for use with the information storage unit of Figs. 1–3.

Although for some applications it may be satisfactory to energize the motor 21 manually from a suitable source of alternating current to position the carriage 9 with respect to a selected tape for recording or reading, there is shown in Fig. 7 a combined block and schematic diagram of apparatus for automatically controlling the motor 21 to transport the carriage 9 to a position adjacent a selected tape.

The control circuit of Fig. 7 includes a register 110 for receiving a number corresponding to one of the tapes stored in the machine. The register 110 may comprise a conventional electronic register having a plurality of bi-stable circuits, each of which is adapted to register a binary digit. Therefore, by applying binary coded input signals to the register 110, there may be provided a registration corresponding to a selected tape.

In the general description of Fig. 1, consideration was given to the operation of the lamp 33, the light interrupting disk 32, and the photocell 34 in providing a pulse corresponding to each tape when the carriage 9 is being transported.

Figure 6:
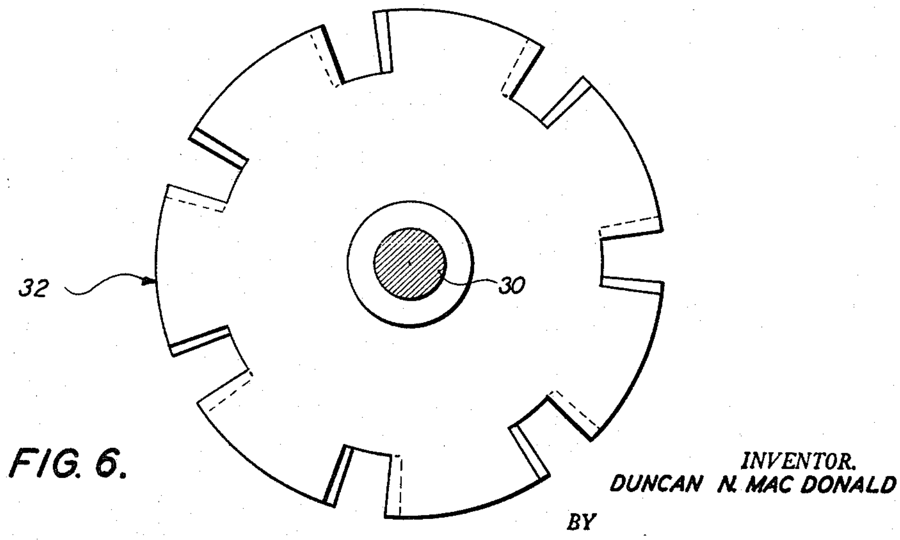
Fig. 6 is a plan view of a light interrupting disk for use in the embodiment of Figs. 1–3.

Fig. 6 shows a light interrupting device by means of which the duration of each of the pulses may be adjusted. The light interrupting device 32 of Fig. 6 comprises two separate slotted disks laid one on top of the other so that the effective slotted portion may be adjusted by varying the overlap between the disks.

In order to ascertain the position of the carriage 9 at any given time, the pulses from the photoelectric cell 34 may be applied to a carriage position counter 111 (Fig. 7) via an amplifier 112. The carriage position counter may comprise a conventional binary counter which is adapted to provide a registration in accordance with the number of pulses appearing at the output of the amplifier 112.

The carriage position counter 111 is adapted to count either up or down in response to the pulses appearing at the output of the amplifier 112 in accordance with the voltage output of a coincidence circuit 113 coupled between the register 110 and the carriage position counter 111.

Assuming that the tapes in the machine shown in Fig. 1 are numbered from left to right, it will be appreciated that the appearance of a number in the carriage position counter 111 which is larger than the number registered in the register 110, indicates that the carriage 9 is positioned to the right of the selected tape. A carriage control circuit 115 senses the output of the coincidence circuit 113 and applies an alternating current to a winding 116 of the motor 21. The motor 21 may be a conventional reversible motor such as the type which is commonly used in servomechanisms.

By applying a given phase of alternating current to a winding 117, and an alternating current to the winding 116 which is displaced in phase by 90°, the rotor 118 is caused to rotate. By varying the phase of the alternating current applied to the winding 116 over a range of 180°, the rotor may be rotated in either direction. In response to a signal appearing on the lead 114, which indicates that the carriage 9 is positioned to the right of the selected tape, the carriage control circuit 115 applies an alternating current to the winding 116 to cause the rotor 118 to rotate to transport the carriage 9 towards the left of the machine as seen in Fig. 1 toward the selected tape.

When the direction of carriage transport is in decreasing numerical order, i.e., to the left, the carriage position counter 111 responds to the signal appearing on the lead 114 to count down from the number registered therein upon the receipt of each pulse from the amplifier 112. When the carriage 9 is positioned under the selected tape, the coincidence circuit 113 senses that the count in the carriage position counter 111 corresponds to the registration in the register 110 and the signal disappears from the lead 114.

When no signal appears at the output of the coincidence circuit 113, the carriage control circuit 115 does not energize the winding 116 of the motor 21, and the rotor 118 is stationary.

In contrast, if the carriage 9 is located to the left of a selected tape so that the carriage position counter 111 contains a count which is numerically less than the number registered in the register 110, the coincidence circuit 113 is adapted to provide an output signal on the lead 120. In response to the signal on the lead 120, the carriage control circuit 115 applies alternating current to the winding 116 of a suitable phase to cause the rotor 118 of the motor 21 to rotate in a direction for transporting the carriage 9 towards the selected tape, i.e. to the right as viewed in Fig. 1.

The signal appearing on the lead 120 is also applied to the carriage position counter 111 to cause it to count up in response to each pulse provided by the amplifier 112 so that the carriage position counter 111 keeps step with the instantaneous position of the carriage 9. As before, when the carriage 9 is adjacent the selected tape, the coincidence circuit 113 causes the carriage control circuit 115 to cease energizing the winding 116.

The carriage 9 is registered in accurate alignment with the tape support rod 3 by means of the indexing strip 53 and the spherical pawl 54, which may be elevated to a notch in the indexing strip 53. The transducer support frame 47 which carries the spherical pawl 54 may be elevated by means of the electromagnet 46 discussed in detail above with reference to the construction of the carriage 9. The electromagnet 46 may be energized from the carriage control circuit 115 via a lead 119. By this means, the carriage is locked in position and the transducers 10 and 11 are raised into engagement with the selected tape in a single operation.

When the carriage 9 is adjacent a selected tape and the transducers 10 and 11 are raised into engagement therewith, the tape may be transported in either direction by applying the voltage appearing on the lead 119 to either the electromagnets 70 which actuate the pinch roller 12, or the electromagnets 72 associated with the pinch roller 13.

Although a manually operable switch 122 is illustrated for selecting the pair of electromagnets 70 and 72 to be actuated for transporting the tape in one direction or the other, it will be appreciated that an automatic mechanism may be included in lieu of the switch 122 for selecting the direction of tape transport.

When the direction of tape transport has been ascertained, and either the electromagnets 70 or the electromagnets 72 have been energized, thereby causing the tape to be transported past the transducers 10 and 11 from one of the bins to the other, the tape being transported may be recorded or read in a conventional fashion by means of the transducers 10 and 11.

Where the apparatus of the present invention is used in conjunction with internally programmed digital computers, external control apparatus (not shown) may be included for entering the number of a selected tape in the register 110, selecting the direction of tape transport and either reading or recording information via the transducers 10 and 11.

Although the apparatus has been described for use in connection with magnetizable tapes, it will be appreciated that the invention is capable of being used where information is stored on other types of elongated recording media, as for example, perforated tape and magnetizable wires.

I claim:

1. An information storage system comprising a plurality of lengths of magnetic tape, a pair of compartmented storage bins for storing the magnetic tapes, means including a plurality of guides for supporting portions of the tapes in loops positioned between the pairs of bins, the tapes being supported by the guides with the respective loops in side-by-side relationship, carriage means, means for movably supporting the carriage means within the loops, the carriage supporting means passing through all the loops, whereby the carriage means can be positioned along the support means opposite any selected tape loop, transducer means mounted on the movable carriage means, means for moving and positioning the carriage means with the associated transducer means opposite a selected tape loop, means for moving the transducer means into and out of engagement with the tapes, and means for selectively driving the tapes over the guide means from one bin to the other bin, including a pair of drive rollers engageable with all of the tapes and rotating in opposite directions, and means supported by the carriage means for pressing the selected tape against one or the other of the drive rollers.

2. An information storage system comprising a plurality of lengths of magnetic tape, a pair of compartmented storage bins for storing the magnetic tapes, means including a plurality of guides for supporting portions of the tapes between the pairs of bins, the tapes being supported by the guides in side-by-side relationship, carriage means, means for movably supporting the carriage means, the supporting means extending past all of the tapes in the region of the tape portions located between the bins, whereby the carriage means can be positioned along the support means opposite any selected tape, transducer means mounted on the movable carriage means, means for moving and positioning the carriage means with the associated transducer opposite a selected tape, and reversible drive means for selectively driving the tapes over the guides in either direction from one bin to the other bin, the drive means including means movable with the carriage means for engaging the drive means with a selected tape for transporting the selected tape from one bin to the other.

3. An information storage system comprising a plurality of lengths of magnetic tape, means for storing the magnetic tapes including first and second storage regions for each tape, means including a plurality of guides for supporting portions of the tapes between the storage regions of said storage means, the tapes being supported by the guides in side-by-side relationship, carriage means, means for movably supporting the carriage means, said means extending past all of the tapes in the region of the tapes located between the storage regions, whereby the carriage means can be positioned along the support means opposite any selected tape, transducer means mounted on the movable carriage means, means for moving and positioning the carriage means with the associated transducer opposite a selected tape, and reversible drive means for selectively driving the tapes over the guides in either direction from one storage region to the other storage region, the drive means including means movable with the carriage means for engaging the drive means with a selected tape for transporting the selected tape from one storage region to the other.

References Cited in the file of this patent

UNITED STATES PATENTS

| | | |
|---|---|---|
| 1,196,335 | Clokey | Aug. 29, 1916 |
| 2,227,259 | Hokanson | Dec. 31, 1940 |
| 2,481,398 | Danisch | Sept. 6, 1949 |
| 2,551,198 | Barrett | May 1, 1951 |
| 2,674,728 | Potter | Apr. 6, 1954 |
| 2,690,913 | Rabinow | Oct. 5, 1954 |
| 2,722,676 | Begun | Nov. 1, 1955 |
| 2,733,425 | Williams et al. | Jan. 31, 1956 |